Sept. 10, 1940.  F. H. RAGAN  2,214,235
METHOD AND APPARATUS FOR FORMING BEARINGS
Filed Feb. 1, 1937  6 Sheets-Sheet 1

INVENTOR
FREDERICK H. RAGAN
BY
ATTORNEYS

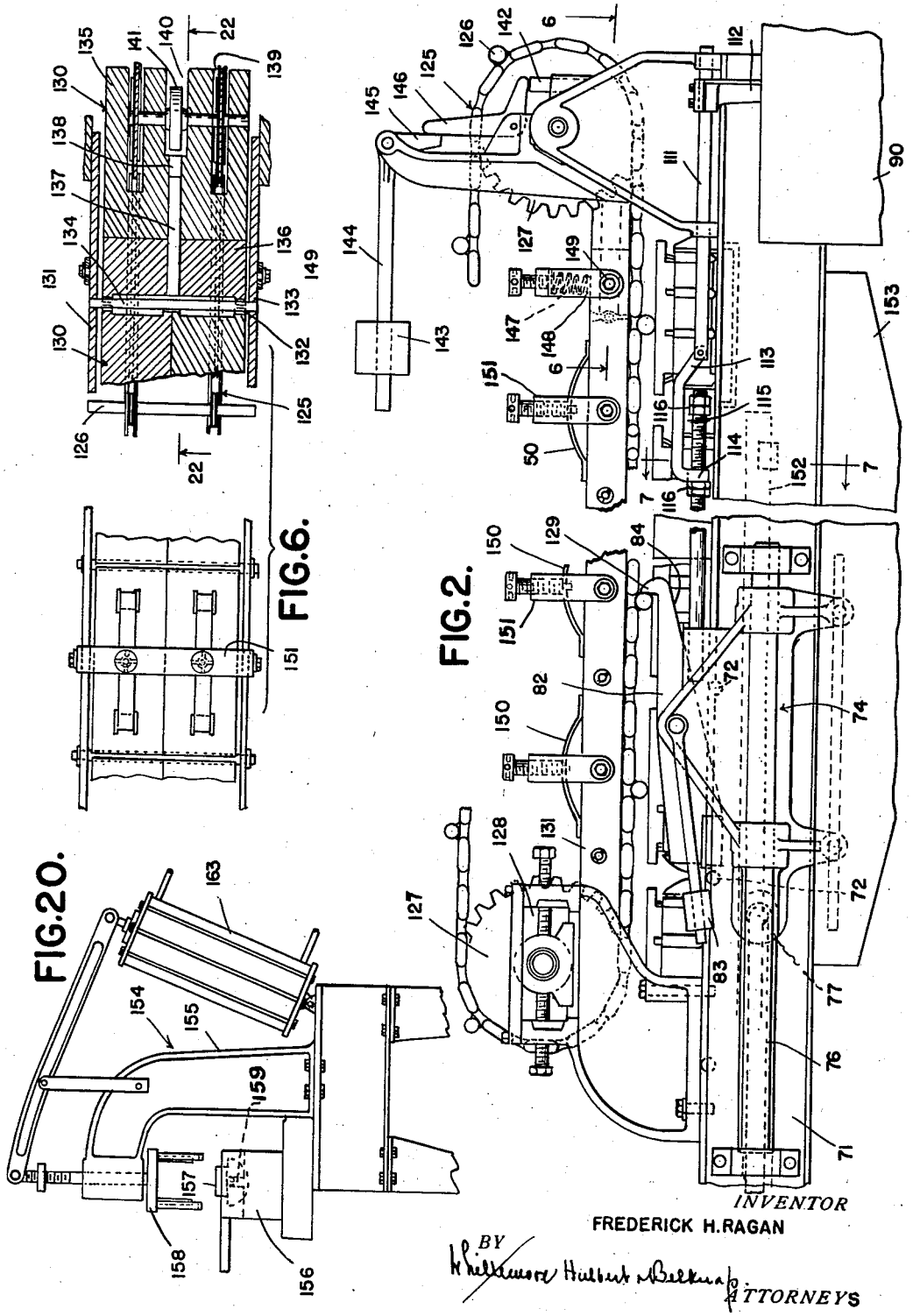

Sept. 10, 1940.   F. H. RAGAN   2,214,235
METHOD AND APPARATUS FOR FORMING BEARINGS
Filed Feb. 1, 1937   6 Sheets-Sheet 3

INVENTOR
FREDERICK H. RAGAN
BY
ATTORNEYS

Sept. 10, 1940.   F. H. RAGAN   2,214,235
METHOD AND APPARATUS FOR FORMING BEARINGS
Filed Feb. 1, 1937   6 Sheets-Sheet 4
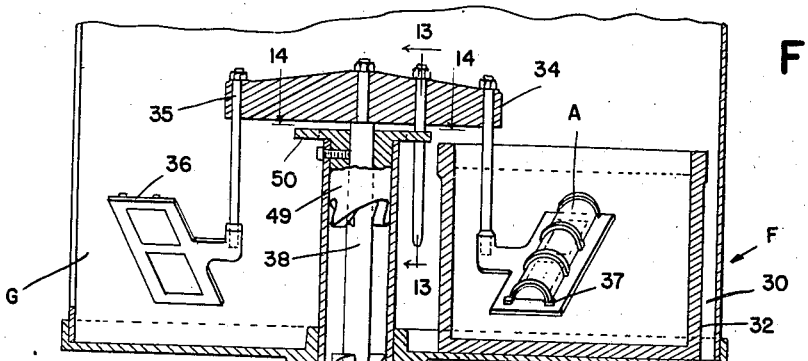
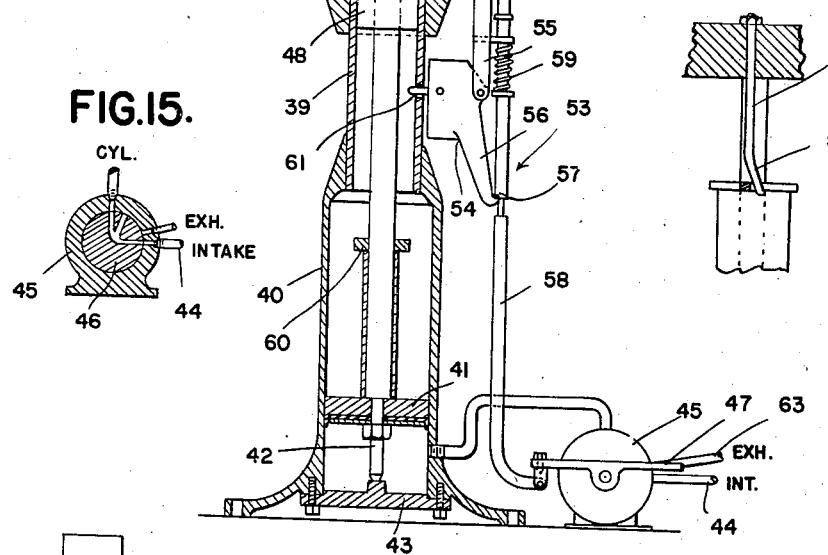
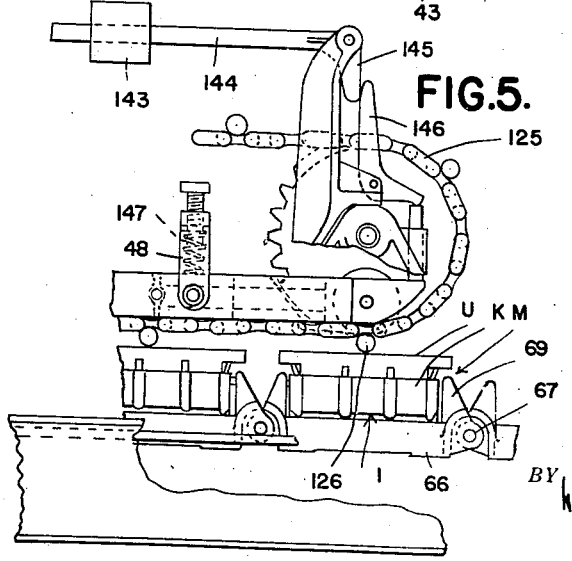
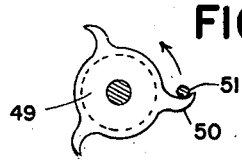
*INVENTOR*
FREDERICK H. RAGAN
BY
*ATTORNEYS*

Sept. 10, 1940. F. H. RAGAN 2,214,235
METHOD AND APPARATUS FOR FORMING BEARINGS
Filed Feb. 1, 1937 6 Sheets-Sheet 5
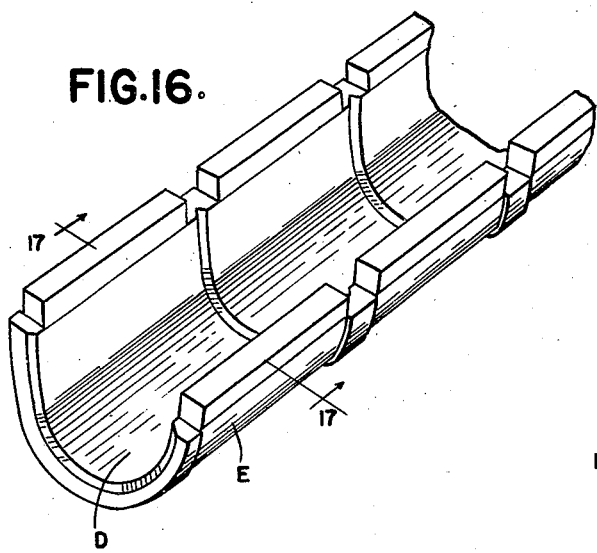
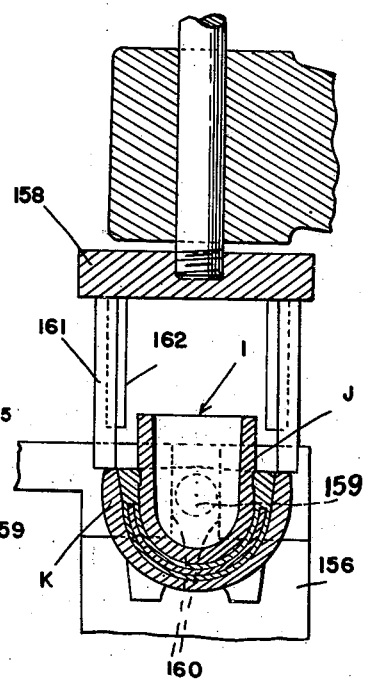
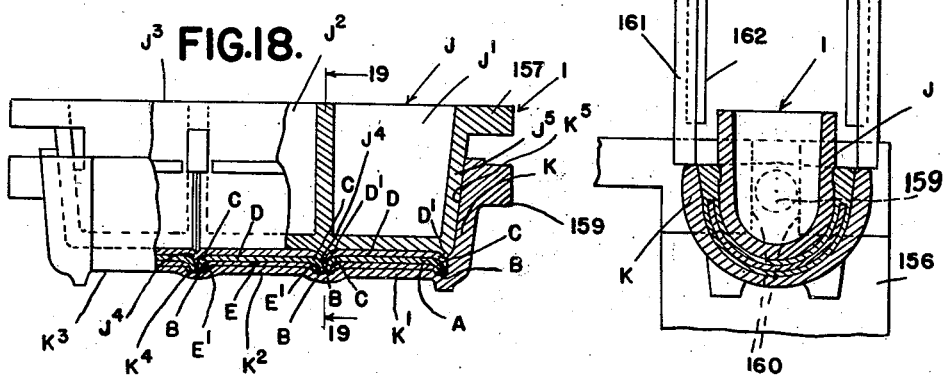
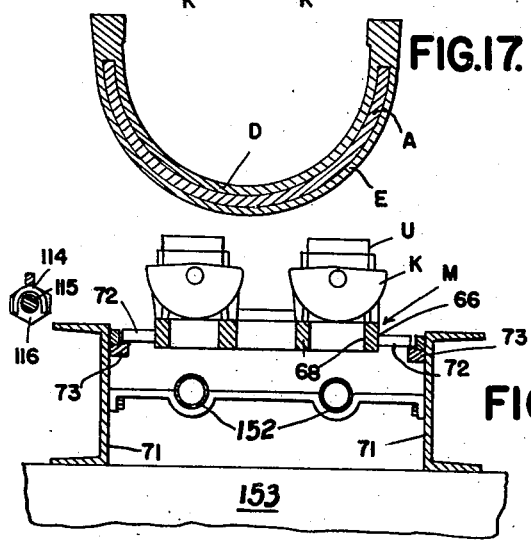
*INVENTOR*
FREDERICK H. RAGAN
BY
*ATTORNEYS*

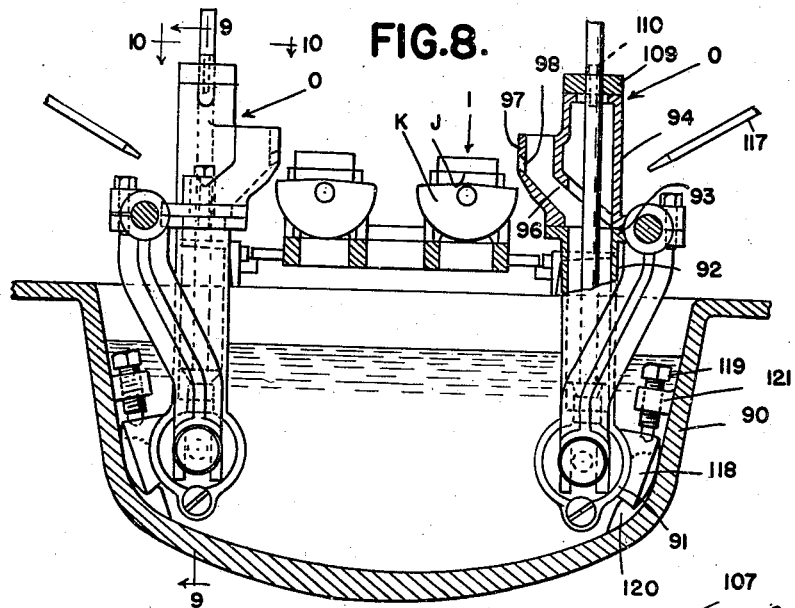

UNITED STATES PATENT OFFICE 2,214,235

METHOD AND APPARATUS FOR FORMING BEARINGS

Frederick H. Ragan, Detroit, Mich., assignor to The Bohn Aluminum & Brass Corporation, Detroit, Mich., a corporation of Michigan Application February 1, 1937, Serial No. 123,533

14 Claims. (Cl. 22—58)

This invention relates generally to an improved method and apparatus for manufacturing bearings of the type in which a shell having the desired strength and rigidity is coated with a metal possessing good bearing qualities.

It is one of the principal objects of this invention to simplify, render more efficient, and improve generally the manufacture of bearings of the character set forth by employing a method composed of relatively few steps capable of coating bearing shells with bearing surfaces free from porosity and offering the possibility of reducing subsequent machining operations to a minimum by holding the bearing surfaces very closely to the desired dimensions. The manufacture of bearings in accordance with my improved method is further enhanced by providing apparatus capable of expediently and efficiently carrying out the several steps of the method.

Another advantageous feature of this invention consists in a method of forming bearings of the above type rendering it commercially practical to form the bearing surfaces of an alloy of cadmium, heretofore considered extremely difficult to handle in production due to its sensitivity to oxidation.

Although the method contemplated by this invention may be practiced with various different types of apparatus, nevertheless, the apparatus disclosed herein possesses numerous advantageous features which not only materially contribute to expediently effecting the several steps of the method but, in addition, are largely responsible for the ability of the present invention to satisfactorily handle the cadmium alloy to form bearing surfaces free from porosity.

One of the principal features of the apparatus consists in the provision of a pump for supplying molten metal to the bearing mold embodying means for maintaining a column or head of molten metal from the source of supply of the metal to the discharge opening in the pump so as to avoid oxidation in the pump and the accumulation of air bubbles in the molten metal.

Additional advantageous features of the apparatus and method of manufacture will be made more apparent as this description proceeds, especially when considered in connection with the accompanying drawings, wherein:—

Figure 2 is a fragmentary side elevational view of the construction shown in Figure 1;

Figure 5 is an enlarged elevational view of one end of the apparatus shown in Figure 1 and having certain parts broken away for the sake of clearness;

Figure 6 is a sectional view taken substantially on the plane indicated by the line 6—6 of Figure 2;

Figure 7 is a cross sectional view taken substantially on the plane indicated by the line 7—7 of Figure 2;

Figure 8 is a sectional elevational view of the supply means for the molten metal;

Figure 9 is a sectional view taken substantially on the plane indicated by the line 9—9 of Figure 8;

Figure 10 is a cross sectional view taken substantially on the plane indicated by the line 10—10 of Figure 8;

Figure 11 is a cross sectional view taken on the plane indicated by the line 11—11 of Figure 9;

Figure 12 is a sectional view taken substantially the plane indicated by the line 12—12 of Figure 1;

Figure 13 is a sectional view taken substantially on the plane indicated by the line 13—13 of Figure 12;

Figure 14 is a sectional view taken substantially on the plane indicated by the line 14—14 of Figure 12;

Figure 15 is a sectional view through one type of valve that may be employed in association with the device shown in Figure 12;

Figure 16 is a perspective view of a series of bearings having bearing surfaces applied in accordance with this invention;

Figure 17 is a cross sectional view taken substantially on the plane indicated by the line 17—17 of Figure 16;

Figure 18 is a side elevational view, partly broken away, of a multiple bearing mold having a series of bearings in the mold cavity formed thereby;

Figure 19 is a cross sectional view taken substantially on the plane indicated by the line 19—19 of Figure 18;

Figure 20 is a side elevational view of a device employed to separate the mold sections subsequent to the molding operation;

Figure 21 is a sectional view illustrating the manner in which the mold sections are separated by the device shown in Figure 20.

In Figures 16 to 19, inclusive, I have illustrated a specific bearing formed in accordance with my improved process and apparatus in which A designates a steel semi-cylindrical shell provided with outwardly extending flanges B at its opposite ends integrally connected to the body of the shell by means of the rounded or curved portions C. It will be observed from the above figures that upon completion of my improved method of manufacture to be presently described, the shell A is provided on its inner side with a lining D of suitable bearing metal having portions D' extending around the curves C and over the outer sides of the flanges B. It will further be noted that the shell A is provided with a surrounding layer E of the bearing metal having the portions E' extending outwardly along the inner surfaces of the flanges B.

Figure 1:
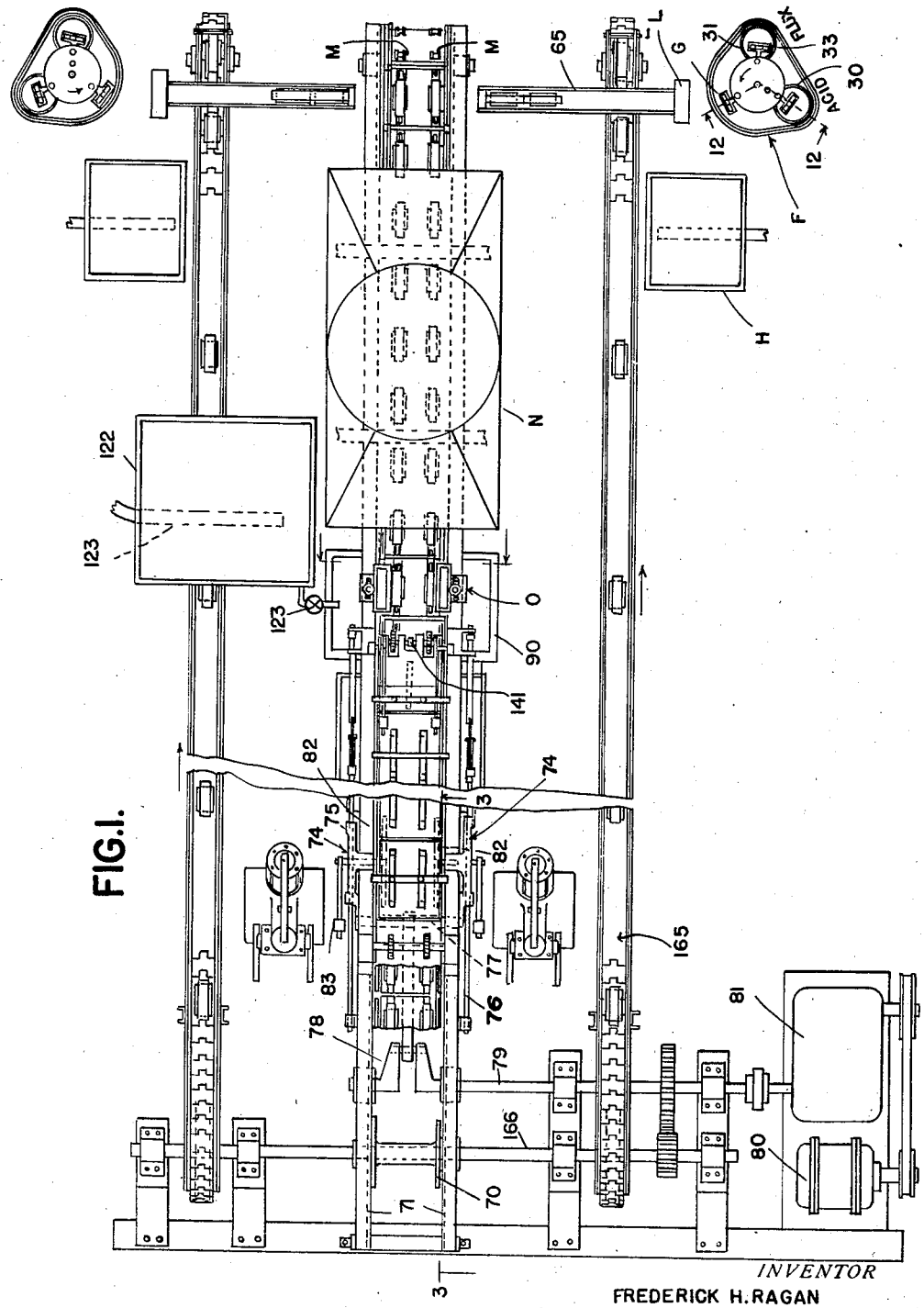
Figure 1 is a fragmentary plan view of the apparatus employed herein for carrying out the several steps of the method of manufacture.

Although it is believed that the various steps of the method of manufacturing a bearing of the above type will be readily understood from the following description of the apparatus employed, nevertheless, the steps of the method will be briefly set forth prior to describing the apparatus in detail. The first step in my improved method of manufacture consists in grouping a plurality of shells A on a support with the shells in alignment with each other, in the manner shown in Figure 12, and thereafter introducing the support with the shells thereon into a cleaning solution preferably of acid. The group of shells are then introduced into a bath of flux and, after being thoroughly coated with the flux, are removed from the support as a group and immersed into a tinning bath. As will be thoroughly understood from the following description of the apparatus, the group of shells are successively introduced into the cleaning and fluxing baths by the device F, shown in Figures 1 and 12. This device is provided with a loading station G, wherein the shells from the fluxing bath are gripped as a unit by tongs of suitable construction and are dipped into the tinning bath H.

After the tinning operation, the shells are engaged with a multiple mold I, shown in Figures 18 and 19. The mold I comprises an inner mold member J and an outer mold member K cooperating with each other to retain the shells in a predetermined position therein and to provide mold cavities for receiving the molten bearing metal. The engagement of the shells with the mold is effected by first placing the inner mold J in a reverse position on a suitable supporting table L and then placing the shells over the inner mold as they are withdrawn from the tinning bath H by the tongs. After the tongs have been released from the shells, the outer mold K is placed over the shells and into engagement with the inner mold J, in the manner clearly shown in Figure 18. In the present instance, the inner mold member J is formed with three sections $J^1$, $J^2$, and $J^3$ for receiving the respective shells A. The bearing shells A are properly positioned with respect to each other and separation of the shells subsequent to the molding operation is facilitated by means of substantially V-shaped ribs $J^4$ on the outer surface of the inner mold section J. The outer mold section has corresponding portions $K^1$, $K^2$, and $K^3$ which are separated from each other by means of grooves $K^4$ positioned opposite the V-shaped ribs $J^4$ for receiving the latter. In addition, the outer mold section K is provided with similar grooves at the opposite ends thereof and these grooves, together with the grooves $K^4$, receive and fit against the peripheral surfaces of the flanges B of the bearing shells to properly position the latter in the mold cavity formed by the two mold sections. The mold sections J and K are also held concentric with each other and are properly spaced by end portions $J^5$, on the inner mold member $J^1$, engaging correspondingly shaped recesses $K^5$ in the outer mold member. The construction is such that when the shells are placed in the molds and the two sections thereof are assembled with each other, mold cavities of exact dimensions are formed, both at the inside and outside of the shells.

After the shells are assembled in the mold in the manner previously set forth, the mold is inverted to the position thereof shown in Figure 18 and is placed upon an intermittently movable conveyor M. Positioned in the path of travel of the conveyor M is a heating chamber N for receiving the molds with the shells in assembled relation therewith, and as the molds travel through this chamber, the shells and mold members are preheated to the temperature required for the molten metal to effectively adhere to shells and flow freely in mold members. As the molds are moved by the conveyor out of the heating chamber N, they are positioned opposite the discharge opening of a suitable pump assembly O, and molten metal is introduced into the mold cavity. This molten metal may be of any relatively soft alloy having the desired bearing properties but, in the present instance, an alloy of cadmium is employed. This alloy has a higher specific gravity than the metal of which the mold sections are formed, and sufficient alloy is pumped into the cavity of the mold to actually lift the upper mold section J relative to the lower mold section K. In other words, the volume of the molten metal pumped into the mold cavity exceeds the capacity of the latter and causes the upper mold section J to float on the molten metal in the cavity.

Upon continued movement of the conveyor, the inner mold section J is pressed downwardly, or back into seating relation with the outer mold section K so that any trapped air may be flushed out. The mold is then thoroughly cooled and the two sections separated from one another to release the coated bearings. In cooling the mold attention is called to the fact that the contact of the cooling medium with the mold is localized at the bottom of the mold substantially midway of the open upper ends of the mold cavity. This is important since it effects a natural shrinkage of the bearing metal from the upper side edges of the mold cavity.

The apparatus selected herein for the purpose of illustrating the manner in which the several steps of the above method may be carried out is shown as having two production lines located in juxtaposition to each other for simultaneously coating two series of bearing shells with the bearing metal as the molds containing the shells are progressively moved from one end of the line to the other. Both production lines are identical in construction and, in the interest of simplicity, only one of the units will be described in detail herein.

It has previously been stated that the device F functions to condition the bearing shells prior to introducing the latter into the tinning bath H, and this device is shown in Figures 1 and 12 to 14, inclusive. As will be observed from the above figures, the device F comprises a cleaning station 30 and a fluxing station 31, in addition to the loading station G. The cleaning station 30 is provided with a receptacle 32 adapted to contain an acid suitable for cleaning the bearing shells and the fluxing station 31 is provided with a similar receptacle 33 containing a solution suitable for fluxing the bearing shells. The three stations are spaced equal distances from each other in symmetrical relation to the axis of a combined vertically reciprocable and rotatable head 34. The head 34 is provided with three depending rods 35 having supports 36 secured to the lower ends thereof and spaced from each other a distance approximating the space between the three stations. In other words, the supports 36 are predeterminedly spaced from each other to provide for simultaneously immersing two of the supports in the cleaning and fluxing baths, respectively. The supports 36 are of sufficient length to provide for positioning a plurality of bearing shells A in alignment with each other on each support, and the latter are inclined at an angle to the horizontal so that when the same are raised out of their respective baths, the fluid is effectively drained back into the receptacles and air is prevented from accumulating beneath the shells. In this connection, it will be noted that the three supports 36 are provided with stops 37 at the lower ends thereof for positioning and retaining the series of bearing shells thereon.

With the above construction, it will be noted that when two of the supports are immersed in the respective cleaning and fluxing baths, the third support is in a position at the loading station G, wherein the operator may readily position another series of bearing shells on this support. The head 34 is then raised and rotated throughout the number of degrees necessary to register the bearing shells at the loading station with the cleaning station and to advance the shells from the latter station to the fluxing station. The shells on the support 36 leaving the fluxing station are then positioned at the loading station, where they may be removed and dipped into the tinning bath H, while the head 34 is again lowered to immerse the bearing shells on the remaining supports in the respective baths.

Referring now more in detail to the mechanism for effecting the above movements of the head 34, it will be noted that this head is secured to the upper end of a shouldered shaft 38 extending axially through a vertical supporting sleeve 39 having the lower end secured to the upper end of a fluid pressure cylinder 40. The lower end of the shaft 38 has a piston 41 secured thereto which is reciprocably mounted in the cylinder 40 and is provided with a stop 42 at the lower end thereof for engaging the bottom of the cylinder 43 to limit the downward movement of the head 34. The portion of the cylinder 40 below the piston 41 communicates with a fluid supply line 44 through the medium of a three-way valve 45 having a revoluble valve member 46 actuated by a treadle 47. When the treadle 47 is depressed by the operator, the valve member 46 assumes the position thereof shown in Figure 15, wherein communication is established between the supply line 44 and the lower end of the cylinder 40. The pressure thus built up on the underside of the piston 41 effects an upward movement of the shaft 38 and head 34 to lift the supports 36 out of the cleaning and fluxing receptacles 32 and 33, respectively.

As soon as the supports 36 clear the receptacles, the shaft 38 is rotated throughout the number of degrees required to advance the supports to their next adjacent stations. The rotation of the shaft 38 is effected by cooperating engageable cam members 48 and 49, respectively secured to the shaft 38 and supporting tube 39. As shown in Figure 12, the fixed cam 49 is secured to the tube 39 at the upper end of the latter and forms a bearing for the shaft 38, while the cam 48 is secured to the shaft 38 intermediate the ends thereof and has a sliding fit with the inner side walls of the tube 39. The axial spacing between the two cams is predetermined in dependence upon the extent of vertical movement of the head 34 required to position the supports above the cleaning and fluxing receptacles. Referring again to Figure 12, it will be noted that the adjacent surfaces of the cooperating cams are shaped in such a manner that when the cam 48 engages the fixed cam 49, the former is rotated by the latter throughout the number of degrees required to effect the desired rotation of the head 34. Attention may be called to the fact at this time that provision is made to prevent engagement of the two cams at a neutral point, and this is accomplished by providing three laterally extending positioning fingers 50 on the upper end of the cam 49 for engagement with a rod 51 extending downwardly from the head 34 and having the lower end inclined slightly, as at 52, to provide a cam portion. It will be observed from Figure 14 that the positioning fingers 50 are spaced from each other distances corresponding to the spacing of the stations, and that the rod 51 is so located on the head 14 as to engage one of the fingers 50 each time the head is lowered. It will, of course, be understood that the rod 51 is fixed with respect to the cam 48 and is so located that it will rock the shaft 38 a sufficient distance upon downward movement of the head to insure proper engagement of the cam surfaces when the shaft is again moved upwardly.

The means for lowering the head 34 after it has been raised and advanced by the shaft 38 is shown in Figure 12 as comprising the trip mechanism 53. This trip mechanism comprises a trigger 54 pivotally supported intermediate the ends on a fixed bracket 55 and having a finger 56 at the lower end adapted to engage a shoulder 57 on a link 58 for holding the valve 45 in a position wherein communication is established between the source of supply 44 and the cylinder 40. In this connection, it is to be noted that the upper end of the link 58 is slidably supported on the bracket 55 and is normally urged in a downward direction by means of a spring 59. The lower end of the link 58 is pivotally connected to the treadle in a position wherein movement of the latter by the operator to open the valve 45 effects an upward movement of the link 58 against the action of the spring 59 and permits the finger 56 to move into engagement with the shoulder 57. Thus, when the operator removes his foot from the treadle, the finger prevents closing of the valve by the spring 59 through the connection of the link 58 with the treadle. Attention may be called to the fact that the pivotal connection between the trigger 54 and bracket 55 is so determined with respect to the center of gravity of the trigger that the weight of the latter will tend to maintain the finger 56 in a position to engage the shoulder 57 on the link 58.

The trigger 54 is actuated by a trip 60 secured to the shaft 38 and engageable with a projection 61 on the trigger adapted to extend through the tube 39 into the path of travel of the trip. The relative location of the trip 60 and projection 61 is predetermined so that engagement of the trip with the projection will be delayed until the shaft 38 has been raised to practically its uppermost position. In other words, the trigger 54 is actuated during the final rotative movement of the head 34 so that closing of the valve 45 will not be effected until the supports have been advanced to their next adjacent positions. In this connection, it will be noted that engagement of the trip 60 with the projection 61 swings the finger 56 out of engagement with the shoulder 57 and permits the spring 59 to move the treadle 47 back to its normal position through the medium of the link 58. In other words, the rotary valve member 46 is rotated by the spring 59 to establish communication between the cylinder 40 and the exhaust line 63. The consequent reduction of the pressure in the cylinder 40 below the piston 41 permits the head 34 and associated parts to be returned to their lowermost position by the action of gravity.

As soon as the support 36 for the bearing shells in the fluxing bath 33 is raised to a position above this bath, the operator grips the series of bearings on the above support with a pair of tongs and dips the bearing shells into the tinning bath H. The series of shells are then removed from the tinning bath and placed over the inverted inner mold section J previously supported on the table L, and the outer mold section K is placed over the shells to form the mold cavity for the bearing metal. Another series of bearing shell blanks are then positioned on the free support during the interval the latter is at the loading station G, and the above operation is repeated.

Figure 4:
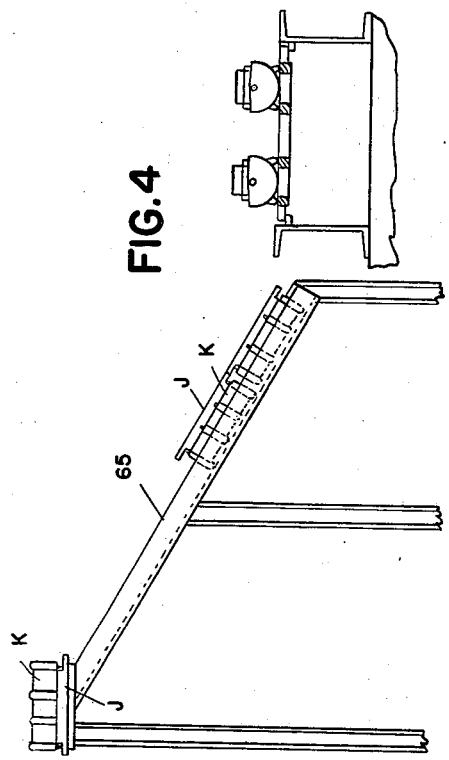
Figure 4 is a fragmentary end elevation of the apparatus featured in Figure 1.

The assembled mold on the table L is then inverted to its normal position and placed on the chute 65. The chute 65 is shown in Figure 4 as inclined toward the intermittently movable continuous conveyor M, so that the mold is moved by its own weight to a position adjacent the conveyor.

The conveyor M is shown in Figures 5 and 7 as constructed of a plurality of links 66 having the adjacent ends pivotally connected together, as at 67, and having laterally spaced side members 68 integrally connected together at opposite ends. The outer sections K of the mold I are adapted to be supported on the side members 68 of the links in the manner clearly shown in Figure 7, and suitable projections 69 extend upwardly from opposite ends of each link for engagement with the adjacent ends of the mold I to position the latter on the links. The conveyor chain thus formed is reeved around pulleys 70 freely rotatably supported at opposite ends of the machine frame between the side sills 71 of this frame, and the chain is supported at points spaced from each other in the direction of travel thereof upon the side sills 71. Upon reference to Figure 7, it will be noted that in cases where a dual production line is resorted to, conveyor chains for both lines may be integrally connected together and, in the present instance, are both supported between the sills 71 by means of pins 72 extending laterally outwardly from opposite sides of the compound chain for sliding engagement with a suitable track 73 secured to the sills 71 at the inner sides thereof.

The conveyor chain is advanced intermittently at a rate determined to insure sufficiently heating the bearing shells in the mold as they are moved through the heating chamber N and to also insure completely filling the mold cavities during the intervals the latter are positioned adjacent the pump O. In the present instance, the conveyor is intermittently advanced by a carriage 74 shown in Figures 1 and 2, inclusive, as having slides 75 positioned at opposite sides of the sills 71 and reciprocably mounted on guides 76 having the opposite ends secured to the sills. The rear ends of the two slides 75 are connected together by means of a pin 77 extending through elongated slots formed in the sill members 71. The pin 77 is, in turn, operatively connected to a crank 78 formed on a crankshaft 79 driven by means of an electric motor 80 through suitable reduction gearing 81. With the above construction, it will be noted that rotation of the crankshaft 79 effects a reciprocation of the carriage 74 relative to the conveyor chain M and, in the present instance, movement of the carriage 74 in a rearward direction by the crank 78 is transferred to the conveyor chain M to effect a corresponding movement of the conveyor. This is accomplished herein by a pair of rocker arms 82 respectively pivotally connected intermediate their ends to the slides 75 at opposite sides of the sills 71. Suitable counterweights 83 are associated with the rear end portions of the rocker arms to maintain the latter ends in sliding engagement with the tracks 73 in the path of travel of the pins 72 projecting laterally from opposite sides of the carriage. The lower edges 84 of the rocker arms are inclined in an upward direction to such an extent that when the carriage 74 is moved forwardly relative to the conveyor, the portions of the inclined edges 84 of the rocker arms 82 to the rear of the pivotal connection of these arms with the slides 75, are successively engaged by the pins 72 and swung upwardly against the action of the weights 83 to position the rear edges of the arms 82 on the track 73 in advance of the associated pins 72. Thus, when the crank 78 starts its return stroke to move the carriage rearwardly, the arms 82 effect a corresponding rearward travel of the carriage by reason of the engagement of the rear edges of these arms with the pins 72 on the carriage. It will, of course, be understood that the spacing of the pins 72 is so determined with respect to the stroke of the carriage that each time the latter is moved forwardly to a position approaching the end of its stroke, the rear ends of the rocker arms 82 are positioned in advance of one set of pins 72 on the conveyor.

With the above construction, it will be noted that after the mold I containing the bearing shells A is positioned on one of the links 66 of the conveyor at the forward end of the latter, the mold is advanced to the rear end of the machine by step by step movements. Upon reference to Figure 1, it will be noted that the mold is advanced by the conveyor through the heating chamber N adapted to be heated by suitable units (not shown) to a temperature sufficient to heat the molds and bearing shells to the extent required to secure an effective bond between the bearing metal and the bearing shells. As the mold leaves the oven N, it is immediately advanced by the conveyor to a position directly over a tank 90 containing the molten bearing metal and in registration with the pump O supported within the tank. As briefly indicated above, the pump supplies sufficient molten metal into the mold cavity around the bearing shells therein to float the inner section J of the mold. During the next step of advancement of the conveyor, the inner section J of the mold is pressed back into seating relationship with the outer section K of the mold, so as to displace the excess bearing metal and thereby prevent any tendency for air bubbles to accumulate in the mold cavity.

Referring now to the particular construction of the pump illustrated in Figures 8 to 11, inclusive, it will be noted that the tank 90 contains two pumps for supplying both units of the production line. Both of these pumps are identical in construction and, accordingly, only one will be described in detail. Upon reference to Figure 9, it will be noted that the pump O comprises a horizontal pressure cylinder 91 immersed in the bearing metal in the tank and communicating adjacent the rear end thereof with a vertically projecting tubular extension 92. The extension 92 projects beyond the upper end of the tank and is flanged, as at 93, to provide for attaching a casting 94 thereto by means of the bolts 95. The casting is formed with a passage 96 therein communicating with the vertical passage in the extension 92 and is directed laterally inwardly so that the inner wall 97 assumes a position above the outer section K of the mold I in slightly overlapping relation to the adjacent side edge of the outer mold section K. As will be observed from Figure 10, the passage 96 is flared outwardly in the direction of travel of the conveyor to provide an elongated mouth portion approximating in length the length of the mold I. Upon reference to Figures 8 to 10, inclusive, it will be noted that the wall 97 of the passage 96 is provided with a plurality of discharge openings 98 spaced from each other in the direction of length of the mouth of the passage 96. The discharge openings 98 are arranged to discharge molten metal into the mold cavity through the space provided in Figure 19 between the side edges of the inner and outer mold sections. The receiving ends of the discharge openings 98 are reduced so that any oxide accumulating on the top of the head of the molten metal in the passage 96 will be prevented from flowing into the mold cavity. In other words, the arrangement is such that the bearing metal will pass out of the discharge openings 98 beneath the blanket of oxide on the top of the column of bearing metal.

Bearing metal is supplied to the extension 92 from the cylinder 91 by means of a ported piston 99 reciprocably mounted in the cylinder 91 between the intake end of the extension 92 and the forward end of the cylinder. Upon reference to Figure 9, it will be noted that the piston 99 is centrally apertured and slidably receives a connecting rod 100 having means 101 at the rear end for holding the piston in assembled relation therewith and having a valve disc 102 at the forward end adapted to abut the front side of the piston 99. The valve 102 is spaced axially from the means 101 a sufficient distance to allow a slight clearance between the valve and front side of the piston when the latter is being moved in a forward direction. As will be observed from Figure 11, this arrangement is such as to permit bearing metal from the tank 90 to flow past the valve 102 through the axially extending openings 103 formed in the piston, when the latter is moved in a forward direction by the connecting rod.

With this construction, provision is made for filling the space in the cylinder 91 at the rear of the piston with bearing metal when the piston is returned to its forwardmost position by the connecting rod. As soon as the connecting rod is moved in a rearward direction, the valve 102 closes the passages 103 through the piston 99 and effects a movement of the piston toward the extension 92 to force the bearing metal in the cylinder 91 into the extension 92.

As pointed out above, it is desirable to constantly maintain a head of bearing metal in the extension 92 up to the level of the discharge openings 98 in order to prevent the accumulation of air in the extension with resultant oxidation of metal and obstruction of free movement of pump parts. The above is accomplished, in the present instance, by providing a gravity-weighted valve 104 in the extension having a tapered head 105 at the lower end thereof for engaging a correspondingly shaped seat 106 secured in the receiving end of the extension 92. The upper end of the valve member 104 extends through the passage 96 and projects beyond the upper end of the casting 94 so as to permit securing a weight 107 to the upper end thereof. Thus, as the piston 99 is moved rearwardly, the pressure of the bearing metal on the valve head 105 moves the latter upwardly against the action of the weight 107 and supplies the extension with bearing metal. Inasmuch as the extension 92 is at all times provided with a head of bearing metal up to the level of the discharge openings 98, the passage of bearing metal from the cylinder into the extension causes a discharge of bearing metal from the extension into the mold cavity formed by the mold sections J and K. As soon as the pressure on the bearing metal in the head 105 of the valve is relieved, the weight 107 functions to close this valve and trap a head of bearing metal in the extension. The volume of the bearing metal discharged into the extension from the cylinder is at least equal to the amount of metal discharged into the mold cavity, so that a head of bearing metal is maintained at all times in the extension up to the level of the discharge openings 98.

It will be noted from Figure 10 that the casting 94 is slotted, as at 108, to receive the fastener elements 95 and thereby permit laterally adjusting the position of the discharge openings 98 with reference to the molds I. When effecting this adjustment, the closure 109 at the upper end of the casting is moved with the latter by releasing the clamping screws 110. Upon reference to Figure 10, it will be noted that the clamping screws 110 do not extend through the closure but merely serve to clamp the latter in place, so as to prevent air from entering the casting through the opening provided for the passage of the valve rod.

In the present instance, the connecting rod 100 for moving the piston 99 is actuated from the carriage 74 during the idle movement of the carriage to engage the rear ends of the rocker arms 82 with the next adjacent set of pins 72 on the conveyor. This is accomplished by establishing a lost motion connection between the carriage 74 and the connecting rod. In detail, a shift rail 111 is supported upon the machine frame for sliding movement in the direction of reciprocation of the piston 99 and is operatively connected to the forward end of the connecting rod 100 by means of a shifter fork 112. As shown in Figure 2, the rear end of the shift rail is connected to a bracket 113 having a depending projection 114 apertured to slidably receive the forward end portion of a connecting rod 115 having the rear end secured to the carriage 74. As shown in Figure 2, a pair of adjustable stops 116 are located on the connecting rod 115 at opposite sides of the projection 114 in spaced relation to each other axially of the connecting rod 115. These adjustable stops provide the lost motion connection required between the carriage 74 and the piston 99 to limit the stroke of the latter to the predetermined amount necessary to supply the desired quantity of molten bearing metal to the mold cavity in the mold I. In other words, the construction is such that when the carriage 74 is moved forwardly by the crank 78 to engage the rear ends of the rocker arms 82 with the next adjacent set of pins 72 on the conveyor M, the rearwardmost stop 116 engages the projection 114 and imparts the desired stroke to the piston 99. As the carriage 74 is moved rearwardly and approaches its rearwardmost position, the forwardmost stop 116 engages the projection 114 to return the piston 99 to its inoperative position shown in Figure 9.

Attention is called to the fact at this time that the head of bearing metal in the vertical extension 92 is maintained at the proper flowing temperature by means of suitable burners 117 supported adjacent the pumps and directed toward the latter in the manner clearly shown in Figure 8. It will also be apparent from this latter figure that the entire pump assembly is secured in the tank 90 in such a manner as to permit the same to be readily removed when desired, and this is accomplished herein by forming a lateral projection 118 on the cylinder 91 of the pump assembly. The lateral projection is engaged with a portion of the inner side wall of the tank 90 and is secured, by means of a set screw 119, against a lug 120 formed on the inner wall of the tank in the manner clearly shown in Figure 8. The set screw 119 is threadedly supported in a projection 121 extending inwardly from one side wall of the tank adjacent the top of the latter and the lug 120 is substantially V-shaped for receiving a correspondingly shaped portion of the projection 118, with the result that the lower end of the pump is prevented from lateral shifting movement in the tank.

Attention is also directed to the fact that molten bearing metal is supplied to the tank 90 by means of a receptacle 122 communicating with the tank 90 through the medium of a valve control passage 123. The arrangement is such that billets of the bearing metal are melted in the receptacle 122 by the heating unit, diagrammatically indicated by the reference character 123' and, owing to the fact that the receptacle is positioned at a higher elevation than the tank 90, this bearing metal flows by gravity into the tank 90 when the valve in the passage 123 is opened.

It has previously been stated that the specific gravity of the bearing metal employed exceeds that of the metal from which the mold sections are formed and it has also been stated that sufficient bearing metal is discharged into the mold cavity to float the inner mold section J. With this in mind, it will be noted that as the conveyor is again advanced to move the mold beyond the pump O, the upper mold section J passes beneath a travelling chain 125 having cross rods 126 secured thereto in spaced relation to each other in the direction of length of the chain and engageable with the inner mold sections J to force the same back into engagement with the outer mold section K. This causes any excess bearing metal in the mold cavity to be discharged from the mold and avoids porosity of the lining of bearing metal on the shells in the molds. As shown in Figure 2, the pressure chain 125 is of a length to maintain the desired pressure on the inner mold section throughout movement of the mold from the pump to the delivery end of the machine. The opposite ends of the chain 125 are supported upon sprockets 127 positioned adjacent opposite ends of the still members 71 of the machine frame and the sprockets are so located that the lower section of the chain travels above the molds I. The rearwardmost sprocket 127 is adjustable by the means indicated by the reference character 128 to take up the slack in the chain and the latter is advanced by the rocker arms 82 previously referred to as operating the conveyor M. Upon reference to Figure 2, it will be noted that the forward ends of the rocker arms 82 are hook-shaped as indicated at 129, and are adapted to engage the opposite ends of the bars 126 at the same time the rear edges of the rocker arms engage the pins 72 on the carriage. The construction is such that when the rocker arms 82 are moved forwardly by the carriage 74, the arms are tilted about their pivotal connections with the carriage by engagement with the next succeeding set of pins 72 with the inclined cam surfaces 84 of the arms, and this tilting movement of the latter moves the opposite end portions out of the path of travel of the pins 72 and bars 126. The spacing between the bars 126 corresponds to the spacing between the pins 72 so that when the rear edges of the rocker arms are positioned in abutting relation with the front sides of the pins 72, the hooked forward end portions 129 of the arms assume an operative position with respect to the opposite ends of one of the bars. Thus, it will be noted that when the conveyor M is advanced by the rocker arms, the chain 125 is correspondingly advanced.

Supported above the lower section of the chain 125 and extending substantially throughout the length of this section of the chain is a plurality of sectional blocks 130. The blocks 130 are positioned between suitable side rails 131 with the sections of the blocks adjacent each other, so that one section of each block will be positioned above the lower portion of each of the chains 125 when a dual production line is employed. Upon reference to Figure 6, it will be noted that the adjacent ends of the blocks 130 are recessed, as at 132, to form openings 133 for receiving suitable pins 134 having the opposite ends thereof secured in the side sills 131. The opening 133 formed by the cooperating recesses 132 is of slightly greater dimension than the diameter of the pin 134 so as to permit the blocks to be urged downwardly against the lower section of the chain 125 and thereby effect a pressure engagement of the bars 126 with the inner mold sections J.

Figure 22:
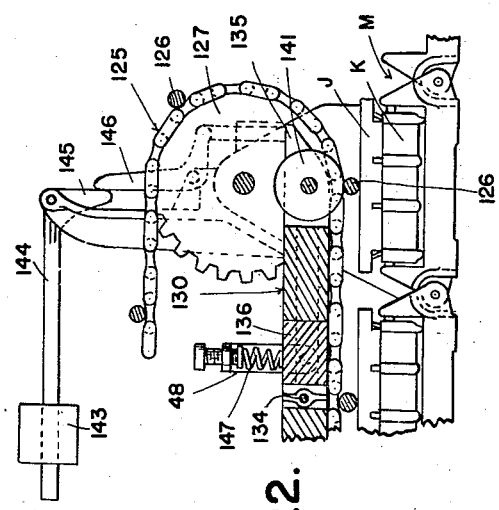
Figure 22 is a sectional view taken substantially on the plane indicated by the line 22—22 of Figure 6.
Figure 3:
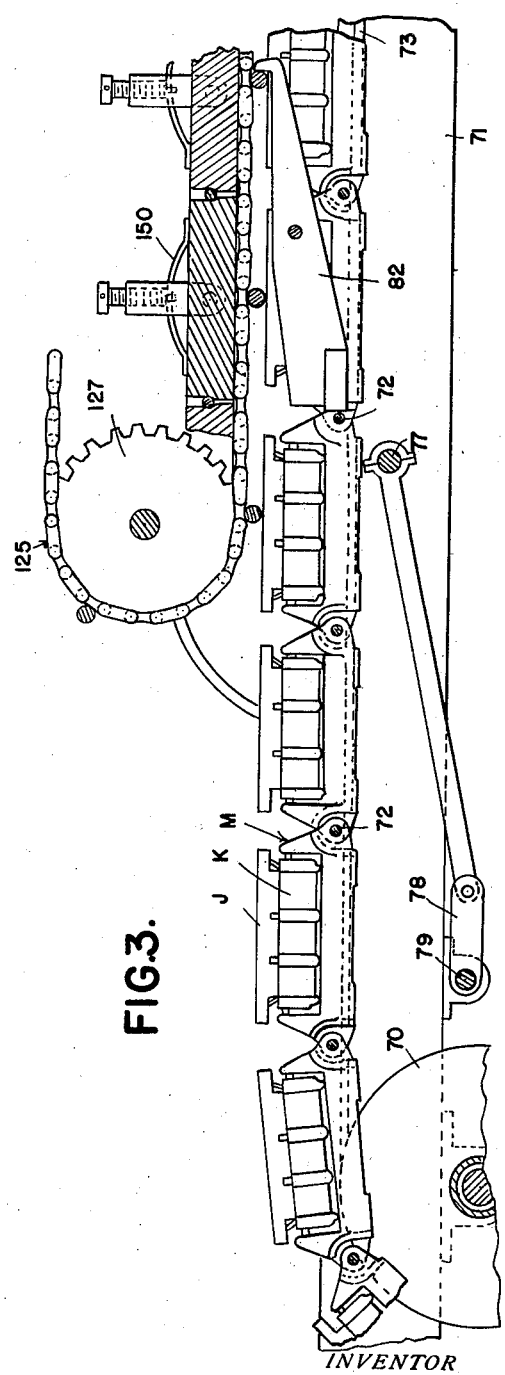
Figure 3 is a sectional view taken substantially on the plane indicated by the line 3—3 of Figure 1.

Referring again to Figure 6 of the drawings, it will be noted that the block 130 at the forward end of the chain 125 is of different construction than the remaining blocks and comprises a section 135 having a width corresponding to the combined width of the two sections of the other blocks and having a rear section 136 of corresponding width. The rear section is provided with a centrally disposed forwardly projecting pin 137 received in a bore 138 in the forward block to permit the latter to tilt about an axis extending parallel to the path of travel of the blocks. This tilting movement of the front section plus the pivoted movement afforded by the pin 134 insures proper contact of the transverse bars of the chain 125 with the molds on the two production lines. In the present instance, the section 135 of the forward block extends to a position in close proximity to the pumps O and is slotted, as at 139, to receive the sprockets 127 of the chains 125. It will also be apparent from Figure 6 that the section 135 is slotted, as at 140, between the two slots 139 and a pressure roller 141 is supported on a shaft within the slot 140. The shaft for the pressure roller 141 is journalled in the block and is preferably in direct vertical alignment with the axis of the sprocket 127 at the front end of the frame. The purpose of the roller 141 is to successively engage the transverse bars 126 intermediate the ends thereof as the same are moved by the chain 125 to a position wherein they engage the inner mold sections J of the mold. Upon reference to Figure 22, it will be noted that the roller 141 is so positioned that the periphery thereof extends below the lower sides of the sprockets 127 in a position to successively engage the bars 126 and force the latter downwardly into engagement with the inner section J of the mold I as it leaves the pump O. In other words, the roller 141 is responsible for returning the inner section J of the mold into engagement with the outer section after the pouring operation. In this connection, it is to be noted that the forward end of the block section 135 is prevented from upward tilting movement by engagement of the roller 141 with the bars 126 by means of plungers 142 supported by the frame of the machine in a position to engage the front end of the block section 135 adjacent opposite sides thereof. Upon reference to Figure 2, it will be noted that the plungers 142 are normally urged into engagement with the block section 135 by means of weights 143 supported on the free ends of a suitable lever 144 having the opposite ends pivotally connected to the machine frame for swinging movement and provided with depending extensions 145 connected to the plungers 142 by means of the bell crank levers 146 to urge the plungers in a downward direction against the block section 135. The rear section 136 of the forwardmost block 130 is yieldably urged in a downward direction to maintain the cross rods 126 into engagement with the inner mold sections by a suitable spring 147 engaging the rear section 136 intermediate the side edges and carried by a yoke 148 which, in turn, is secured to the side sills 131 by means of the fastener elements 149.

As the molds are moved by the conveyor M toward the delivery end of the apparatus, the inner sections J of the molds are maintained in clamping relation to the outer sections K by successive engagement of the remaining blocks with the cross bars 126, and the latter are urged into clamping relation with their respective molds by means of leaf springs 150 acting upon the top surfaces of the block sections. The leaf springs 150 are supported upon suitable yokes 151 secured to the side sills 131 above each set of blocks.

As the molds approach the delivery end of the apparatus, they are effectively cooled by spraying a cooling medium, such as water, against the undersides of the molds substantially midway between the upper side edges of the cavity so as to cause a natural shrinkage of the bearing metal from the upper side edges of the cavity. This may be effected by introducing cooling medium under pressure into a plurality of pipes 152 supported on the frame of the apparatus below the molds and having apertures in the upper sides thereof through which the cooling medium is discharged. The cooling medium discharged against the molds is retrieved by a tank 153 supported below the pipes 152 and communicating with a suitable drain (not shown).

After the molds have been introduced to the cooling operation, they are advanced by the conveyor to a position adjacent the separating device shown in Figures 20 and 21 by the reference character 154. This device comprises a frame 155 having a pair of spaced plates 156 secured thereto for receiving therebetween one of the molds J. The spacing between the two plates 156 is such that the flanges 157 at the ends of the inner mold section J overlap the top edges of the plates and thereby support the mold between the plates. The mold I is laterally positioned with respect to the reciprocable punch 158 of the device 154 by engagement of the projections 159 at the ends of the outer mold sections K between the vertical shoulders 160 at the inner sides of the plates 156. The plunger 158 is provided with two sets of pins 161 and 162 of different length for respectively disengaging the outer section K of the mold from the half bearings and for stripping the latter from the inner section J. It will be observed from Figure 21 that as the plunger 158 is moved downwardly, the longer pins 161 engage the outer section K of the mold I at spaced points so that upon continued downward movement, this section is disengaged from the half bearings and dropped between the plates 156. As downward movement of the plunger 158 continues, the shorter pins 162 engage the top edges of the half bearings at spaced points and strip the latter from the inner mold section J. In the present instance, the plunger 158 is guided throughout its vertical movement by means of a bearing 159 on the frame 154 and movement of the plunger is effected by means of the air cylinder 163.

After the bearings have been stripped from the inner mold sections J, they are transferred to the machining department and finished to the proper size. On the other hand, the mold sections are again assembled and placed upon a conveyor 165 which is in the form of a travelling chain extending for substantially the full length of the apparatus. Upon reference to Figure 1, it will be noted that the conveyor 165 serves to return the molds to the forward end of the machine, wherein they are again placed in operation. The conveyor chain is reeved around sprockets suitably supported at opposite ends of the apparatus and the rear sprocket is driven by a shaft 166 operatively connected to the electric motor 80 through the medium of reduction gearing.

With my improved method and apparatus briefly described, the bearing lining may be formed very closely to the desired size so as to require the minimum amount of machining. In addition, this invention offers the possibility of overcoming the problems heretofore experienced in attempting to form the bearing surfaces of an alloy of cadmium and insures the provision of a bearing surface free from porosity. It will also be understood from the above description that the apparatus selected herein for the purpose of illustrating the method renders it possible to perform several of the steps of the method automatically at a relatively fast rate and is, therefore, advantageous for use in carrying out high production schedules.

What I claim as my invention is:

1. Those steps in the method of forming bearings which consist in positioning a shell in a multiple mold having separable sections cooperating with each other to form a mold cavity adjacent the shell when in assembled relation and open at its upper end, advancing the mold along a predetermined path of travel by a step by step movement, introducing into the upper end of the mold cavity at one of the intervals of rest of the mold sufficient molten metal to float one of said sections, and pressing the floating mold section back into its original position with respect to the other mold section as advancement of the mold continues to discharge the excess molten metal from the open upper end of the mold cavity.

2. Those steps in the method of forming bearings which consist in positioning a shell in a multiple mold having separable sections cooperating with each other to form a mold cavity adjacent the shell when in assembled relation and having an open upper end, advancing the mold along a predetermined path of travel by a step by step movement, heating the mold as it is advanced along said path of travel, introducing into the pre-heated mold cavity at one of the intervals of rest of the mold sufficient molten metal to float one of said sections, pressing the floating mold section back into its original position with respect to the other mold section as advancement of the mold continues to discharge the excess molten metal from the open upper end of the mold cavity, and cooling the mold while the sections are clamped together under pressure.

3. In an apparatus for forming bearings, a conveyor for advancing bearing molds having separable sections along a predetermined path of travel, a flexible member extending in the direction of length of the conveyor and positioned above the path of travel of the molds, means for moving both the conveyor and flexible member by a step by step movement in one direction, and means carried by said flexible member and engageable with said molds to exert a pressure on the latter as they are advanced along said path of travel.

4. In an apparatus for forming bearings, a conveyor for advancing bearing molds having upper and lower separable sections along a predetermined path of travel, a flexible endless member supported above the conveyor and extending longitudinally of the latter with the lower section directly above the molds, means for moving the conveyor and member in unison, and means for urging portions of the lower section of the flexible member into engagement with the upper sections of the molds.

5. In apparatus for forming bearings, the combination with molds having an outer section and an inner section engaging the outer section to form a mold cavity, of a conveyor for advancing the molds along a predetermined path of travel, means positioned at one point along said path of travel for successively discharging into each mold sufficient molten bearing metal to float the inner mold section, a flexible member extending in the direction of length of the conveyor and positioned above the path of travel of the molds, means carried by the flexible member and engageable with the inner mold sections as the molds are advanced from the point of pouring by the conveyor, means for yieldably urging the last named means downwardly to exert sufficient pressure on the inner sections of the mold to return the same into engagement with the outer mold sections, and means for moving the conveyor and flexible member along said path of travel in unison to maintain the mold sections in engagement upon continued travel thereof.

6. In apparatus for forming bearings, a pump for molten metal having a supply cylinder communicating with a vertically extending passage having a discharge opening adjacent the upper end thereof, a piston movable in one direction in the cylinder for forcing molten metal from the cylinder into the passage, and a valve in the passage having a weighted portion extending outside the passage and effective upon return movement of the piston to close the intake end of the passage and thereby trap a head of molten metal in the passage extending from the discharge opening to the point of communication of the passage with the cylinder.

7. In apparatus for forming bearings, a pump for molten metal having a supply cylinder communicating with a vertically extending passage having an elongated discharge chamber at the upper end provided with spaced outlet openings, a piston movable in one direction in the cylinder to force molten metal into the vertically extending passage, and an externally weighted valve effective upon return movement of the piston to close the lower end of the passage and trap a head of molten metal in the passage extending from the outlet openings to the point of communication of the passage with the cylinder.

8. In apparatus for forming bearings, a conveyor for advancing bearing molds along a predetermined path of travel, a displacement pump for molten bearing metal supported at one point along the path of travel of the conveyor and having a reciprocable piston, and means for moving the conveyor by a step by step movement and having a lost motion connection with the piston of the pump for said piston in a direction to displace predetermined quantities of molten metal during the intervals of rest of said conveyor and means for adjusting the stroke of the lost motion connection to vary the quantity of molten metal displaced by the pump.

9. In apparatus for forming bearings, a conveyor for advancing bearing molds by a step by step movement along a predetermined path of travel, a displacement pump for molten metal supported at one point along the path of travel of the conveyor and having a reciprocable piston, a reciprocable slide effective upon movement in one direction to engage the conveyor at the end of the stroke and upon movement in the opposite direction to advance the conveyor throughout one step, and means actuated by said slide upon movement of the latter in the first named direction to move the piston of the pump in a direction to displace molten metal and upon movement of the slide in the second named direction to return said piston.

10. In apparatus for forming bearings, a conveyor for advancing bearing molds by a step by step movement along a predetermined path of travel, a displacement pump for molten metal supported at one point along the path of travel of the conveyor and having a reciprocable piston, a reciprocable slide effective upon movement in one direction to engage the conveyor at the end of the stroke and upon movement in the opposite direction to advance the conveyor throughout one step, and a connection between the slide and piston of the pump to cause said pump to discharge a predetermined quantity of molten metal upon movement of the slide in the first named direction.

11. Those steps in the method of forming bearings which consist in positioning a substantially semi-circular shell in a mold in predetermined relation to a mold cavity therein and with the open side of the shell facing upwardly, heating the mold, introducing molten bearing metal into the cavity at the upper end of the latter, and cooling said mold by localizing the contact of the cooling medium at the bottom of the mold causing a natural shrinkage of the bearing metal from the top of the molds to the bottom of the latter.

12. Those steps in the method of forming bearings which consist in positioning a substantially semi-circular shell in a mold adapted to form a cavity around the shell, supporting the mold with the edges of the shell facing upwardly, heating the mold with the shell therein, introducing molten bearing metal into the cavity at the upper end of the latter, and cooling the mold by localizing the contact of cooling medium at the bottom of the mold substantially midway of the upper edges of the shell.

13. Those steps in the method of forming bearings which consists in positioning a shell in an outer mold section in predetermined spaced relation thereto, positioning in the outer mold section in predetermined spaced relation to the shell an inner mold section having a specific gravity less than that of the bearing metal to be cast to form a mold cavity which is open at its upper end, introducing molten bearing metal into the open upper end of the mold cavity in a quantity in excess of the volume of the mold cavity, thereby causing the inner mold section to float, and thereafter exerting sufficient pressure on the floating mold section to return the latter to its original position in the other mold section and to discharge the excess molten metal from the mold.

14. Those steps in the method of forming bearings which consist in positioning a shell in a multiple mold in predetermined relation to a mold cavity therein, introducing a sufficient quantity of molten metal into the mold cavity to float and displace one of the mold sections so as to enlarge the mold cavity to receive an excess of molten metal and thereafter expelling the excess of molten metal by exerting a pressure on the floating mold section to return the latter to its original position.

FREDERICK H. RAGAN.